Sept. 28, 1937. R. N. MARSHALL 2,094,043
METHOD OF AND MEANS FOR ASSEMBLING ACOUSTIC DEVICES
Filed Nov. 15, 1935 2 Sheets-Sheet 1
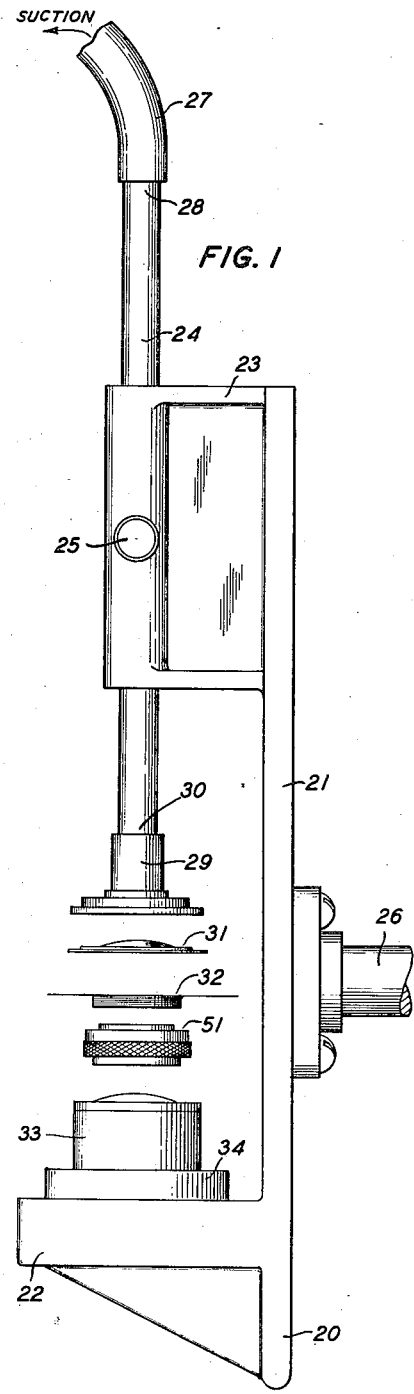
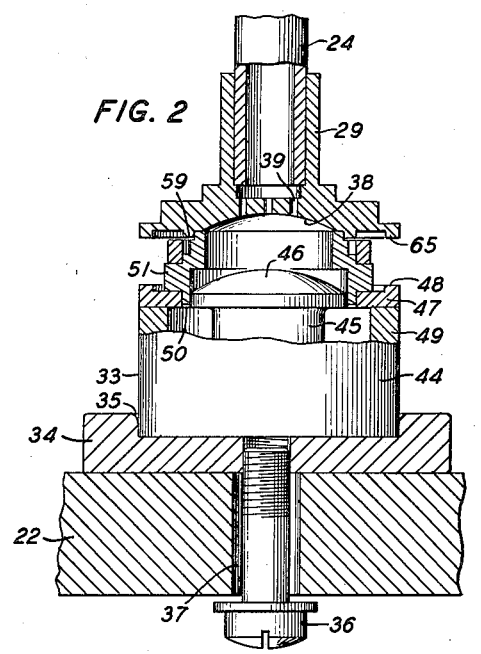
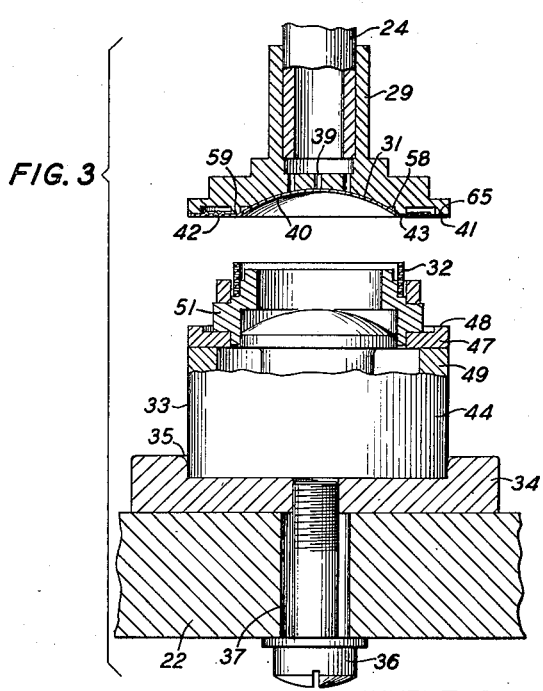
INVENTOR
R. N. MARSHALL
BY
Walter C. Kiesel
ATTORNEY Sept. 28, 1937.   R. N. MARSHALL   2,094,043
METHOD OF AND MEANS FOR ASSEMBLING ACOUSTIC DEVICES
Filed Nov. 15, 1935   2 Sheets-Sheet 2

INVENTOR
R. N. MARSHALL
BY
Walter E. Kiesel
ATTORNEY

Patented Sept. 28, 1937

2,094,043

UNITED STATES PATENT OFFICE 2,094,043

METHOD OF AND MEANS FOR ASSEMBLING ACOUSTIC DEVICES

Robert N. Marshall, Maplewood, N. J., assignor to Bell Telephone Laboratories, Incorporated, New York, N. Y., a corporation of New York Application November 15, 1935, Serial No. 49,899

3 Claims. (Cl. 29—84)

This invention relates to acoustic devices and more particularly to a method of assembly thereof.

An object of this invention is to improve and to simplify the assembly of acoustic devices particularly of the electrodynamic type.

A feature of this invention comprises the assembly of a diaphragm, coil and magnet member of an electrodynamic device into a unitary structure without the use of screws, bolts or other fastening members.

A further feature comprises the assembly of a diaphragm, coil and magnet member of an electrodynamic device in such manner that the coil is permanently correctly centered in the air-gap defined by the magnet structure of the device.

Other and further features will be evident from the detailed description which follows hereinafter.

In accordance with this invention, a magnet member having a central aperture and a second magnet member that extends into said aperture to form an air-gap are mounted on a common support. A gauge or spacing jig is inserted between the magnet members to define an air-gap of predetermined width, the members being secured against relative movement. A coil is supported on the gauge intermediate the magnet and the diaphragm. The latter and the coil are brought into contact and caused to adhere by an adhesive previously applied to either the coil or diaphragm. The gauge is then removed and the peripheral portions of the diaphragm and the magnet brought into engagement, the coil being centered in the air-gap. The diaphragm and magnet structure are caused to adhere by an adhesive previously applied to either one.

A more complete understanding of this invention will be obtained from the detailed description which follows in conjunction with the appended drawings, wherein:

Fig. 1 is a side view of an assembly jig for practicing the invention, showing in spaced relation the parts to be assembled;

Figs. 2, 3, 4 and 5 are views, partly broken away and in section, of the jig and parts of Fig. 1 in different stages of the assembly in accordance with this invention;

Figure 4:
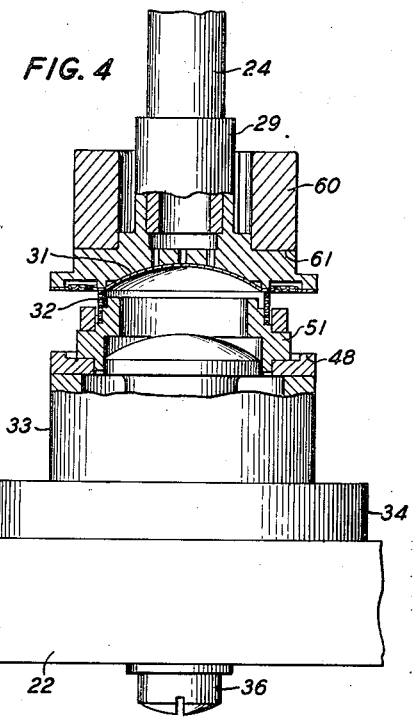

Referring to the drawings, there is shown an assembly jig 20 comprising a vertical support or frame member 21 provided at its lower end with a forwardly projecting shelf portion 22 and at its upper end with a projection or block member 23. A hollow shaft or tubular member 24 passes loosely through the member 23 and may be held in adjusted position by the thumb screw or clamping member 25. A flexible tube 27 is fitted over one end 28 of the shaft 24 and is connected to a suitable suction device or pump (not shown). A member 29 is fitted over the other end 30 of the shaft for a purpose to be explained in detail hereinafter. The jig 20 is carried by a rod 26 that is secured to a suitable support (not shown). The parts to be assembled comprise a diaphragm 31, an annular edge wound metallic ribbon coil 32, and a magnet structure 33. The latter is mounted in a receptacle member 34 having a recess 35 of size and shape adapted to retain the magnet structure against lateral movement. As shown in Fig. 2, the member 34 is capable of a limited adjustment in position on the shelf 22 under control of the clamping screw 36 which extends through the over-size passage 37 in the shelf and threads into the member 34. As shown by Figs. 2 and 3, the under surface 38 of the member 29 is of a contour conforming to that of the diaphragm 31, the central portion of the member 29 containing passages 39, whereby, when the diaphragm is placed against the surface 38 and suction applied to the shaft, the diaphragm is held in position.

The diaphragm is preferably of metal and formed in a single piece having a central dished or dome-shaped portion 40; an outer annular peripheral portion 41; a tangentially corrugated flexible portion 42; and an annular, narrow junction portion 43 to the under surface of which the coil is adapted to be secured.

The magnet structure comprises a pot-shaped member 44 of suitable magnetic material having a central pole 45. A pole member or cap 46 is secured to the center pole, for example, by welding, and an annular plate pole member 47 having a peripheral ridge or flange portion 48 is supported on the outer pole 49. The pole members define an annular air-gap 50 of uniform width adapted to receive initially the gauge member 51 and subsequently the coil 32. After the gauge member is inserted, the member 47 is secured to the outer pole by a suitable adhesive or by welding.

The member 51 is substantially annular, and comprises the annular depending flange 52 slidably insertable in the air-gap 50; shoulder portion 53 engageable with the upper surface of the plate pole around the air-gap; annular shoulder portion 54 to support the coil 32 and of such width that the supported coil will be in centered alignment with the portion 52, and, therefore, the air-gap; annular shoulder portion 55 to support a ring 56 that surrounds the lower portion of the coil to prevent any possible lateral movement thereof on the shoulder 54; and an upwardly projecting annular flange 57 adapted to engage with a recessed portion 58 of the member 29 to ensure the proper alignment of the member 29 and the magnet structure.

Fig. 2 illustrates the initial step in the assembly. With the screw 36 loose, the gauge positioned on and in the magnet structure and the clamping screw 25 loosened so that the shaft and consequently the member 29 are lowered toward the shelf, the receptacle 34 has been adjusted in position until the portion 57 of the gauge fits into the recess 58 of member 29, the annular ridge 59 on the latter is in alignment with the shoulder portion 54 and consequently the air-gap of the magnet structure, and the screw 36 is readily adjusted to the clamping position.

Figure 5:
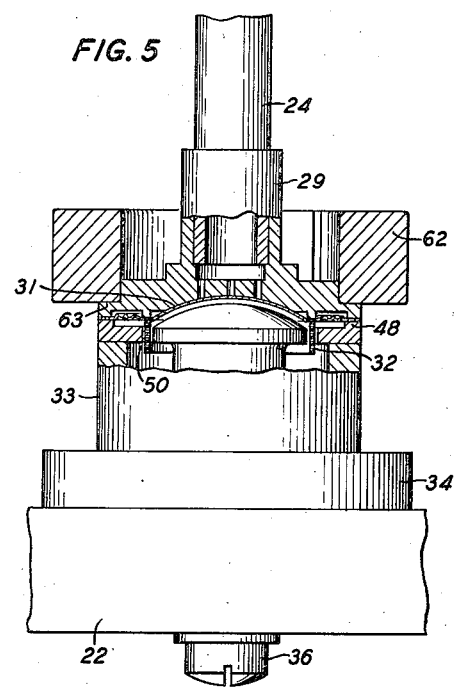
Figure 6:
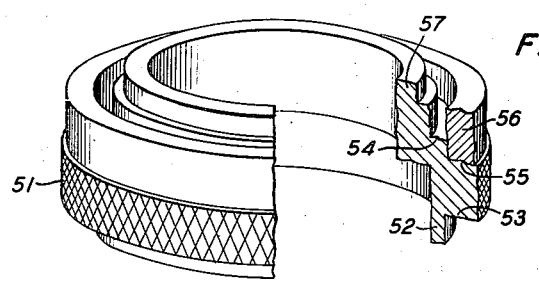
Fig. 6 is an enlarged perspective view, partly broken away and in section, of the gauge employed in practicing the invention.
Figure 7:
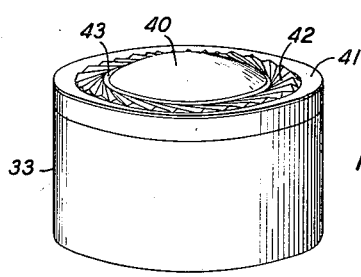
Fig. 7 is a perspective view of an electrodynamic unit assembled in accordance with this invention.

Fig. 3 shows the member 29 moved upwardly from the magnet structure and gauge, the diaphragm 31 held by suction against the surface 38 and the coil 32 supported by the gauge on the shoulder portion 54. The lowermost or inner surface of the junction 43 of the diaphragm, or the uppermost surface of the top turn of the coil 32, or each, may have been coated previously or is now coated with a thermoplastic or a thermosetting cement, or other adhesive. The member 29 is lowered until the diaphragm and the coil are in contact along the junction 43, as shown by Fig. 4, and a previously heated split ring 60 is placed on the shoulder portion 61 of the member 29. The heat communicated through the member 29 to the diaphragm and coil causes the cement or adhesive to set and to secure the diaphragm and coil rigidly together, if the cement is of the thermosetting type; or to soften the cement or adhesive, if of the thermoplastic type, the diaphragm and coil being rigidly secured together upon subsequent hardening of the cement or adhesive. The member 29 is raised, carrying the diaphragm and coil with it, the gauge 51 removed, and the under surface of the portion 41 of the diaphragm and/or the upper surface of the ridge 48 of the plate pole coated with a thermoplastic or thermosetting cement or other adhesive. The member 29 together with the diaphragm and coil are then lowered into the position shown by Fig. 5 with the diaphragm portion 41 engaging the ridge 48, and the coil centered in the air-gap 50. A previously heated split ring 62 is placed upon the shoulder portion 63 of the member 29 to cause the cement or other adhesive to harden or soften and coalesce depending upon the nature of the adhesive employed. The suction is discontinued and when the member 29 is again raised the diaphragm remains attached to the magnet structure and the unity assembly of Fig. 7 is then removable from the jig. The coil leads, of course, may be brought out in any suitable manner.

It is evident, of course, that in the particular jig described, the upper surface of the ridge 48 and the under surfaces of the portions 59, 65 of the member 29 should be parallel, and perpendicular to the axis of the shaft 24, in order that the diaphragm may seat uniformly on the coil and magnet during the assembly. It is apparent, also, that if a thermal-plastic or thermal-setting cement or other adhesive is not employed, but, for instance, a cold setting cement or other adhesive, the heating rings are not necessary.

While this invention has been disclosed with reference to a specific embodiment, it is to be understood that its scope is to be considered as limited by the appended claims only.

What is claimed is:

1. The method of assembly of a diaphragm, a coil and a magnet having an aperture to receive the coil, which comprises mounting the diaphragm and magnet in spaced relation with the coil therebetween, moving the coil and diaphragm into contact and securing them together, and moving the diaphragm and magnet structure into contact, with the coil in said aperture, and securing the diaphragm and magnet structure together.

2. The method of assembly of a diaphragm, a coil and a magnet containing an aperture to receive the coil, which comprises mounting the diaphragm and magnet in spaced relation with the coil therebetween, placing the diaphragm and coil in contact and causing them to be united by an adhesive, and placing the diaphragm and magnet in contact, with the coil in the magnet aperture, and causing the diaphragm and magnet to be united by an adhesive.

3. The method of assembly of a diaphragm, a coil and a magnet structure containing an aperture to receive the coil, which comprises mounting the diaphragm and coil in axial alignment with the coil supported therebetween and in alignment with the magnet structure, bringing the diaphragm and coil in contact and adhesively securing them together along the line of contact, moving the diaphragm toward the magnet until the latter and a portion of said diaphragm are in engagement and with the coil centrally positioned in the magnet aperture, and adhesively securing the diaphragm and magnet structure together.

ROBERT N. MARSHALL.